United States Patent Office 3,535,284
Patented Oct. 20, 1970

1

3,535,284
CONDENSED HETEROCYCLIC POLYMERS
Albert L. Idelson, Morristown, N.J., and Morton H. Litt, Cleveland, Ohio, assignors to Allied Chemical Corporation, New York, N.Y., a corporation of New York
No Drawing. Filed Jan. 18, 1968, Ser. No. 698,730
Int. Cl. C08g 9/06
U.S. Cl. 260—72.5                                                                                                  16 Claims

ABSTRACT OF THE DISCLOSURE

This specification discloses fully and partially condensed heterocyclic polymers prepared by condensation of the reaction products of a 1,3-benzenediamine with an aldehyde or an acetal thereof or a 1,1-bis(2,4-diaminophenyl) alkane with a member selected from the group consisting of aldehydes, acetals thereof, N-formylated amines, formic acid and esters of formic acid in acidic medium. Condensation of the reaction products is effected by heating them in polyphosphoric acid until the desired degree of condensation is achieved. The condensed products are thermally stable at elevated temperatures of 400° C. and higher and are useful as semiconductors and catalysts.

BACKGROUND OF THE INVENTION

Many investigators have attempted to prepare polymers having fully condensed aromatic ring systems in the search for organic materials that are thermally stable at temperatures of 400° C. and higher; however, a completely condensed polymer has not been obtained up until the present time owing to incomplete reaction, crosslinking and chain scission on heating, and the like. For example, the pyrolysis of polyacrylonitrile results in aromatization to a condensed heterocyclic structure with loss of ammonia and hydrogen cyanide as has been demonstrated by Brulant and Parsons, J. Polymer Sci., 22, 249 (1956). This cyclization is incomplete leaving isolated carbon-carbon single bonds which provide sites for chain scission at elevated temperatures. The aromatization of a methyl-substituted 1,5-diketoxime has been reported by C. S. Marvel, ACS Meeting, September 1963, but, again, only partially condensed polymers were obtained.

It is an object of this invention to provide fully condensed heterocyclic polymers.

It is another object to provide heterocyclic polymers which are thermally stable at temperatures up to 400° C. and higher.

It is a further object to provide novel heterocyclic polymer composition which have semiconductance properties and catalytic activity.

Further objects will become apparent from the following detailed description thereof.

We have discovered that certain noncross-linked acridine-type polymers can be fully condensed to form heterocyclic ring polymers by heating them in the presence of polyphosphoric acid at temperatures from about 250° C. to about 450° C. until complete condensation has occurred. The fully condensed polymers are black, brittle, semicrystalline polymers which are thermally stable at temperatures of 550° C. and higher. Partially condensed polymers, wherein at least about 25% of the total theoretical condensation has occurred, are included within the scope of the present invention and are also highly desirable products. They exhibit resistivity in the semiconductor range and are useful as catalysts.

The noncross-linked acridine-type polymers useful in the present invention include the reaction products of a 1,3-benzene diamine with an aldehyde or an acetal thereof in acidic medium, and the reaction products of a 1,1-bis-(2,4-diaminophenyl)alkane with an aldehyde, acetal,

2 thereof, N-formylated amine, formic acid or an ester of formic acid in acidic medium. An acid salt of the amino compounds can also be employed.

The reaction products of a 1,3-benzenediamine of the formula

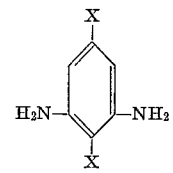

wherein X is hydrogen or an alkyl radical of 1 to 5 carbon atoms or an acid salt thereof and an aldehyde having the formula

wherein R is a hydrocarbon radical of 1 to 17 carbon atoms selected from the group consisting of alkyl, aryl, alkaryl and aralkyl radicals or an acetal derivative thereof of the formula

wherein R" is an alkyl group of 1 to 10 carbons, in acidic medium having a pH of not greater than 5 at a temperature of from —25° C. to about 200° C. are disclosed in a copending United States application of Idelson and Litt, Ser. No. 645,606, filed June 13, 1967.

The acetals suitable for use hydrolyze readily in aqueous acidic solutions to form the corresponding aldehyde which then takes part in the above-illustrated reaction. When an acetal is used in a nonaqueous medium, such as an acidic alcoholic medium, the acetal reacts with acidic hydrogen to give an intermediate of the formula

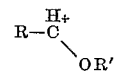

which reacts with 1,3-benzenediamine in the same manner as an aldehyde.

Illustrative of suitable 1,3-benzenediamines are 1,3-benzenediamine; 2-chloro - 1,3-benzenediamine; 5-chloro-1,3-benzenediamine; 2,5-dichloro - 1,3 - benzenediamine; 2-methyl - 1,3-benzenediamine; 5-methylbenzenediamine; 2,5 - dimethylbenzenediamine; and 2-pentyl-1,3-benzenediamine.

In general, most aldehydes and acetals are suitable, and thus a wide variety of polymers can be obtained. Illustrative examples of aldehydes and acetals that can be employed include aliphatic aldehydes, such as acetaldehyde, propionaldehyde, isobutyraldehyde, n-butyraldehyde, n-valeraldehyde, isovaleraldehyde, n-caproaldehyde, stearaldehyde; aromatic aldehydes such as benzaldehyde and mono-substituted derivatives of benzaldehyde such as the tolualdehydes, the chlorobenzaldehydes, o-bromobenzaldehyde; the nitrobenzaldehydes, the aminobenzaldehydes, salicylaldehyde, the hydroxybenzaldehydes, the methoxybenzaldehydes, anisaldehyde, and p-dimethylaminobenzaldehyde, di-substituted derivatives of benzaldehyde such as vanillin, 2-hydroxy-3-methoxybenzaldehyde, gentisaldehyde and 2,6-dichlorobenzaldehyde; tri-substituted derivatives of benzaldehyde such as p-thymol aldehyde, veratraldehyde, protocotechualdehyde and β-resorcylaldehyde; tetra-substituted derivatives of benzaldehyde such as 2-hydroxy-3,5,6-trimethylbenzaldehyde; heterocyclic aldehydes such as the pyridine aldehydes, and 3-pyranaldehyde; polynuclear aldehydes such as 1-, 2-, and 9-anthraldehyde; and unsaturated aldehydes such as 2,4-hexadienal.

Acetals such as 1,1-diethoxyethane, aminoacetaldehyde diethyl acetal, 3-dimethylaminopropionaldehyde diethyl acetal and 11-diethylaminoundecaldehyde diethyl acetal are also suitable. Mixtures of more than one aldehyde can also be employed affording random copolymers. The structure of these copolymers will be dependent upon the relative proportions and relative reactivity of the aldehydes.

Formaldehyde and acetals derived therefrom are not generally suitable. These reactants tend to give insoluble, cross-linked products rather than the desired noncross-linked, soluble polymers.

The reaction between the suitable aldehydes, or acetals, and the 1,3-benzenediamines as described above, can be carried out in any solvent or solvent mixture which is inert to the reaction and which is a solvent for at least one and preferably both of the reactants. The solvent or solvent mixture is chosen so that the reaction will occur readily at or below its boiling point. Suitable solvents include water, methanol, ethanol, ethylene glycol, glycerol, or mixtures of two or more solvents which are miscible with each other.

The reaction medium can be made acidic by the addition of any acid or acid salt which does not interfere with the reaction and which is capable of reducing the pH of the reaction to 5 or less. Illustrative of suitable acidic compounds are mineral acids such as hydrogen halides, sulfuric acid, phosphoric acid and nitric acid; acid salts such as sodium bisulfite and organic acids such as p-nitrobenzoic acid, fumaric acid and oxalic acid. Instead of adding the 1,3-benzenediamine and an acid separately, an acid salt of the 1,3-benzenediamine such as the hydrochloride salt can be employed. The reaction will proceed at an increased rate as the pH of the reaction mixture decreases.

The temperature of the reaction can range from about $-25°$ C. up to about $200°$ C. and is dependent upon the reactivity of the aldehyde. The more reactive aldehydes such as acetaldehyde can be reacted at room temperature or below, whereas less reactive aldehydes will require a higher temperature. The time required for reaction will also vary according to the reactivity of the aldehyde. Longer reaction times will be employed for less reactive aldehydes and when a higher proportion of acridine-type polymer is desired. The optimum temperature and reaction time for each reactant pair and product desired can be determined by test runs.

Equimolar amounts of the reactants are preferred, but their exact proportion is not critical and up to about 50% excess of aldehyde or acetal can be employed.

The polymeric reaction products are insoluble in basic aqueous solution. Thus, they usually can be recovered conveniently by addition of a base such as the hydroxide or carbonate of an alkali metal or an alkaline earth metal to the acidic reaction medium to precipitate the product.

Although the exact composition of the reaction products is unknown, it is believed that they consist principally of polymers having recurring units of the formulas

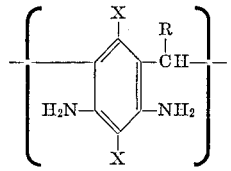

and

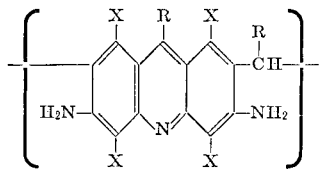

wherein X and R have the meanings given above, the reaction products are generally mixtures of both types of residues, but, when highly reactive aldehydes are reacted, the acridine-type polymer will predominate in a short time.

The reaction products of a 1,1-bis(2,4-diaminophenyl)-alkane having the formula

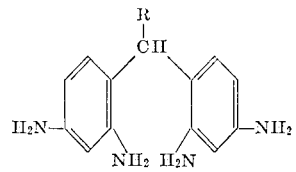

wherein R′ is hydrogen or an alkyl radical of 1 to 5 carbon atoms, or an acid salt thereof, and a compound selected from the group consisting of N-formylated amines, formic acid and esters of formic acid, in an acidic medium having a pH not greater than 6 at a temperature of from about $25°$ C. to about $250°$ C. have been disclosed in copending U.S. application of Idelson and Litt Ser. No. 660,211 filed Aug. 14, 1967 now U.S. Pat. No. 3,418,261. Although the exact composition of the reaction products is unknown, it is believed that they consist principally of a polymer having recurring units of the formula

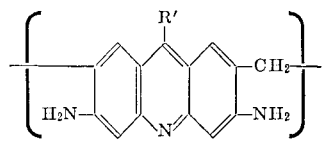

wherein R′ is as defined herein above.

The reaction products of a 1,1,-bis(2,4-diaminophenyl)-alkane having the formula described above or an acid salt thereof, and an aldehyde or an acetal derivation thereof in an acidic medium having a pH of not greater than 5 at a temperature of from $-25°$ C. to about $200°$ C. have been disclosed in copending United States application of Idelson and Litt, Ser. No. 645,605 filed June 13, 1967.

In general, most aldehydes and acetals are suitable for use and thus a wide variety of polymers can be obtainable.

Preferably the compounds reacted with the 1,1-bis(2,4-diaminophenyl)alkane are either aldehydes of the formula

where R is selected from the group consisting of hydrogen, alkyl radicals, preferably of 1 to 17 carbon atoms; unsaturated acylic hydrocarbon radicals, preferably of 1 to 17 carbon atoms, homocyclic and heterocyclic aromatic radicals, preferably of 1 to 14 carbon atoms; and derivatives of said radicals substituted with halogen; alkoxy, preferably containing 1 to 10 carbon atoms; amino; substituted amino, preferably substituted with alkyl groups of 1 to 5 carbon atoms; alkyl, preferably of 1 to 10 carbon atoms; hydroxy and nitro, or acetals of the formula

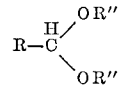

where R has the meaning given above and R″ is an alkyl group of 1 to 10 carbon atoms.

Illustrative examples of aldehydes and acetals that can be employed include aliphatic aldehydes such as formaldehyde, acetaldehyde, propionaldehyde, isobutyraldehyde, n-butyraldehyde, n-valeraldehyde, isovaleraldehyde, n-caproaldehyde, stearaldehyde; aromatic aldehydes such as benzaldehyde and mono-substituted derivatives of benzaldehyde such as the tolualdehydes, the chlorobenzaldehydes, o-bromobenzaldehyde, the nitrobenzaldehydes, the aminobenzaldehydes, salicylaldehyde, the hydroxybenzaldehydes, the methoxybenzaldehydes, anisaldehyde, and p-dimethylaminobenzaldehyde; di-substituted derivatives of benzaldehyde such as vanillin, 2-hydroxy-3-methoxybenzaldehyde, gentisaldehyde and 2,6-dichlorobenzaldehyde; tri-substituted derivatives of benzaldehyde such as p-thymol aldehyde, veratraldehyde, protocotechualdehyde and β-resorcylaldehyde; tetra-substituted derivatives of benzaldehyde such as 2-hydroxy-3,5,6-trimethylbenzaldehyde; heterocyclic aldehydes such as the pyridine aldehydes, and 3-pyranaldehyde; polynuclear aldehydes such as 1-, 2-, and 9-anthraldehyde, and unsaturated aldehydes such as 2,4-hexadienal. In addition, acetals such as diethoxymethane, 1,1-diethoxyethane, aminoacetaldehyde diethyl acetal, 3-dimethylaminopropionaldehyde, diethyl acetal and 11-diethylaminoundecaldehyde diethyl acetal are also suitable. Mixtures of more than one aldehyde can also be employed.

The reaction between the suitable aldehydes, or acetals, and the 1,1-bis(2,4-diaminophenyl)alkanes described above, can be carried out in any solvent or solvent mixture which is inert to the reaction and which is a solvent for at least one and preferably both of the reactants. The solvent or solvent mixture is chosen so that the reaction will occur readily at or below its boiling point. Suitable solvents include water, ethanol, methanol, ethylene glycol, glycerol, or mixtures of two or more solvents which are miscible with each other.

The reaction medium can be made acidic by the addition of any acid or acid salt which does not interfere with the reaction and is capable of reducing the pH of the reaction to 5 or less. Illustrative of suitable acidic compounds are mineral acids such as hydrogen halide, sulfuric acid, phosphoric acid and nitric acid; acid salts such as sodium bisulfite and organic acids such as p-nitrobenzoic acid, fumaric acid and oxalic acid. Instead of adding the tetraamine and the acid separately, an acid salt of the tetraamine such as the hydrochloride salt can be employed. The reaction will proceed when the pH of the reaction mixture is 5 or lower. The reaction will proceed at an increased rate as the pH of the reaction mixture decreases.

The temperature of the reaction can range from about −25° C. up to about 200° C. and is dependent upon the reactivity of the aldehyde. The more reactive aldehydes such as acetaldehyde can be reacted at room temperature or below, whereas less reactive aldehydes will require a higher temperature. The time required for reaction will also vary according to the reactivity of the aldehyde. Longer reaction times will be employed for less reactive aldehydes and when a higher proportion of acridine-type polymer is desired. The optimum temperature and reaction time for each reactant pair and product desired can be determined by test runs.

Equimolar amounts of the reactants are preferred, but their exact proportion is not critical and up to about 50% excess of aldehyde or acetal can be employed.

The polymeric reaction products are insoluble in basic aqueous solution. Thus, they usually can be recovered conveniently by addition of a base, such as an hydroxide or a carbonate of an alkali metal or an alkaline earth metal, to an acidic water solution of the polymer to precipitate the product which is then washed and dried.

Although the exact composition of the reaction products is unknown, it is believed that they consist principally of mixtures of polymers having recurring units of the formulas

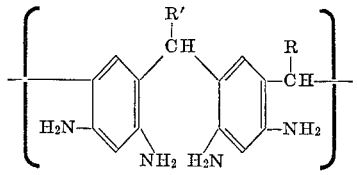

and

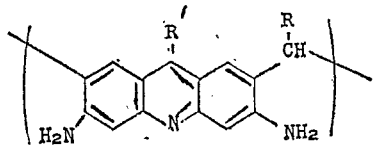

wherein R and R' are as hereinabove defined.

To prepare the condensed polymers of the instant invention, the reaction products as described above, or mixtures thereof, are heated in polyphosphoric acid at temperatures of from about 250° C. up to about 450° C. The preferred heating temperature range is from about 290° C. up to about 350° C. Although the mechanism of the condensation is not completely understood, it is believed to proceed by elimination of ammonia from an acridine-type polymer and aromatization. In the case of mixtures containing diamino or tetraamino units in addition to the acridine-type units, these amino units condense first to the acridine-type structures. This sequence can be illustrated as follows:

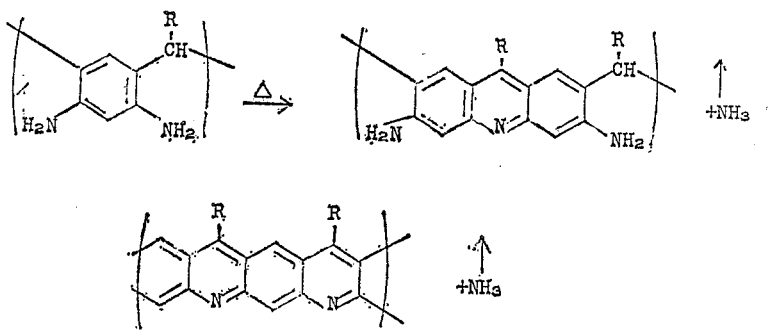

The degree of condensation of the above-described polymer compositions increases directly with time and temperature, and the heating time required to prepare a fully condensed polymer at a given temperature can be determined experimentally. The degree of condensation obtained can be determined by a consideration of the carbon-nitrogen ratio as calculated from the elemental analysis of the product.

When the desired degree of condensation has been reached, the reaction mixture is cooled and the products recovered, as by pouring into water. The precipitated products are filtered, washed with water or dilute alkali to remove the polyphosphoric acid and dried in any convenient manner as will be known to one skilled in the art.

The partially condensed products of the invention, wherein at least 25% of the total theoretical condensation has occurred, are semiconductors and are useful in the field of electronics for thermoelectric devices and the like. These partially condensed products are also useful as catalysts. The fully condensed polymers are stable to heat at high temperatures and thus are highly desirable high temperature semiconductor materials.

The invention can be illustrated further by the examples given below but it is to be understood that the invention is not meant to be limited to the details described herein. In the examples, all parts and percentages are by weight unless otherwise noted.

EXAMPLE 1

100 parts (0.553 mol) of 1,3-benzenediamine dihydrochloride, 58.7 parts (0.553 mol) of benzaldehyde, 200 parts by volume of methanol and 125 parts of water were charged to a round-bottom flask fitted with a thermometer, nitrogen inlet and outlet, reflux condenser and means of heating. The solution was heated at reflux temperature for 6 hours. An initially red color gradually darkened to brown. The methanol was evaporated, and sodium hydroxide solution was added until a brown-black precipitate appeared. The solids were filtered, washed with water until neutral and dried at 100° C. in a vacuum oven overnight.

The product had a reduced viscosity of 0.06 measured as a 2% solution in dimethylformamide at 25° C.

Elemental analysis was: C, 83.2%; H, 5.63%; N, 11.52%. This corresponds to a polymer with a mixture of units having an average structure of the formula:

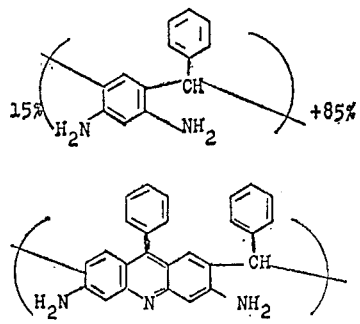

12.0 parts of the products prepared above were charged to a vessel containing 300 parts of polyphosphoric acid. The vessel was immersed in a sand bath filled with means for controlled heating and the temperature was increased gradually to 290° C. The mixture was maintained at 290° C.–300° C. for 16 hours, cooled to about 75° C. and poured into cold water. The product was washed thoroughly with water and dried under vacuum.

The results of elemental analysis were: C, 75.6%; H, 6.75%; N, 3.9%; and water, 12.7%. These results correspond to that of a fully condensed polymer having recurring units of the formula.

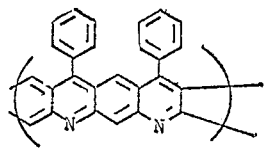

Thermogravimetric analysis of the condensed product under nitrogen atmosphere showed no weight loss up to 375° C. and only a 5% weight loss at 650° C. An isothermal analysis at 550° C. showed an initial weight loss of about 8% during the first 8 minutes, probably due to loss of water vapor and no further loss during the next 23 minutes.

EXAMPLE 2

10.0 parts of the reaction product of 1,3-benzenediamine dihydrochloride and benzaldehyde prepared in Example 1 were added to 300 parts of polyphosphoric acid and heated to 200° C. When foaming subsided, the temperature was increased gradually at 315° C. and heating continued for 5 hours longer. The mixture was cooled to about 100° C. and poured into cold water. The black solid product was washed with water and dried.

The results of elemental analysis were: C, 81.6%; N, 8.5%; H, 3.4%. These results indicate that about 60% of the possible theoretical condensation had occurred.

Thermogravimetric analysis showed only a 33% weight loss at 900° C.

A small quantity of the product dried at 400° C. was measured for electron paramagnetic resonance. The result was $10^{21\pm1}$ electrons per gram.

The condensed product showed substantial catalytic activity as demonstrated by the following experiment: 0.8 part of the product, which had a 2 square meters of surface area as measured by standard nitrogen adsorption technique, was charged to a tube fitted with gas inlet and outlet and connected to a trap. The tube was inserted in a suitable heater maintained at 227° C. 2.70 parts of reagent grade formic acid were added through the inlet tube over a 2-minute period. The products were collected in the trap. 17.8% of the formic acid was decomposed.

EXAMPLE 3

9.05 parts (0.05 mol) of 1,3-benzenediamine dihydrochloride were dissolved in 40 parts of water and the solution cooled by means of an ice bath. 2.2 parts (0.05 mol) of freshly distilled acetaldehyde were dissolved in 10 ml. of water and added slowly to the stirred diamine solution over a ½-hour period. The reaction was allowed to continue for an additional hour and then the solution was brought to a pH 11 with sodium hydroxide solution. A yellow precipitate formed which was recovered, washed and dried.

The product had a reduced viscosity of 0.06 as a 2% solution in dimethylformamide at 25° C.

1.2 parts of the product were added to 100 parts of polyphosphoric acid as in Example 1 and heated to 300° C. The reaction was continued for 11 hours. The black solution product was treated with sodium hydroxide, washed with hot water and dried under vacuum.

The results of elemental analysis were: C, 70.1%; H, 3.2%; N, 9.9%. This corresponds to a completely condensed polymer having recurring units of the formula

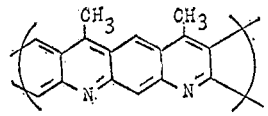

X-ray analysis showed a crystalline peak at 3.4 angstroms.

EXAMPLE 4

The tetrahydrochloride salt of bis(2,4-diaminophenyl) methane was prepared by reducing bis(2,4-dinitrophenyl) methane dissolved in glacial acetic acid with hydrogen using a 5% palladium on carbon catalyst. During the reduction the temperature was maintained at 25° C. After reduction the catalyst was filtered off and anhydrous HCl was bubbled through the filtrate, thereby precipitating the desired product.

10.0 parts (0.0268) mol of bis(2,4-diaminophenyl) methane tetrahydrochloride, 2.34 parts (0.0321 mol) of N,N-dimethylformamide and 115 parts by volume of ethylene glycol were charged to a heavy walled tube which was then evacuated, sealed and immersed in an oil bath at 175° C. for 3 hours. The tube was cooled to room temperature and the contents poured into sodium hydroxide solution to precipitate the product. The product was filtered, washed with water until neutral and dried.

The brown solid had a reduced viscosity of 0.05 measured as a 2% solution in dimethylformamide at 25° C.

The results of elemental analysis were: C, 72.7%; H, 5.9%; N, 15.9%.

This corresponds to a polymer having recurring units of the formula

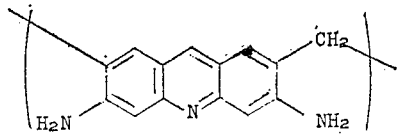

5.0 parts of the product prepared above and 150 parts of polyphosphoric acid were charged to a reactor and slowly heated to 290° C. The reaction was continued at 300–320° C. for 4.5 hours longer. The mixture was cooled to about 75° C., poured into ice water and filtered. The product was washed and dried as in Example 1.

The product was a black solid having a crystalline peak at 3.4 angstroms as determined by X-ray diffraction analysis. An electron paramagnetic resonance measurement was about $10^{21}$ electrons per gram.

The results of elemental analysis were: C, 78.1%; H, 4.3%; and N, 11.2%. This corresponds to a fully condensed product having recurring units of the formula

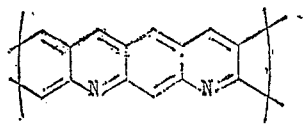

Thermogravimetric analysis reported no weight loss up to 375° C. and less than a 5% weight loss at 650° C. in a nitrogen atmosphere. An isothermal analysis at 550° C. reported a weight loss of about 7% during the first 10 minutes, probably due to loss of water vapor, and no further change during the next 20 minutes.

EXAMPLE 5

Other condensed polymers are obtained by repeating the condensation procedure of Example 1 substituting other reaction products than that of benzaldehyde and 1,3-benzenediamine dihydrochloride. Thus, employing equimolar amounts of bis(2,4-diaminophenyl)methane tetrahydrochloride and benzaldehyde as reactants, the final fully condensed product obtained has recurring units of the formula

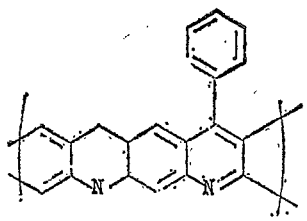

It will be apparent that numerous modifications and variations may be effected without departing from the scope of the novel concepts of the present invention, and the illustrative details disclosed are not to be construed as imposing undue limitations on the invention.

We claim:

1. A thermally stable polymer prepared by condensing an acridine-type polymeric reaction product selected from the group consisting of reaction products of a 1,3-benzenediamine with an aldehyde having the formula

or the acetals thereof of the formula

wherein R″ is an alkyl group of 1 to 10 carbons, wherein R is a hydrocarbon radical of up to 17 carbon atoms selected from the group consisting of alkyl, aryl, aralkyl and alkaryl, in acidic medium having a pH up to about 5 at a temperature of −25° C. to about 200° C., and reaction products of 1,1-bis(2,4-diaminophenyl) alkane with a member selected from the group consisting of aldehydes having the formula

wherein R has the meaning given above, acetals thereof, N-formylated amines, formic acid and esters of formic acid, in acidic medium having a pH to about 5, at a temperature of 25° C. to about 250° C., by heating said acridine-type polymeric reaction product in polyphosphoric acid at temperatures from about 250° C. up to about 450° C. until at least 25% of the total theoretical condensation has occurred.

2. A polymer according to claim 1 consisting essentially of recurring units of the formula

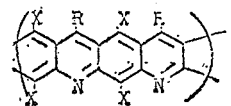

wherein R is as defined above and X is hydrogen or an alkyl radical of 1 to 5 carbon atoms.

3. A polymer according to claim 1 consisting essentially of recurring units of the formula

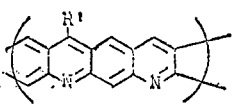

wherein R′ is hydrogen or an alkyl radical of 1 to 5 carbon atoms.

4. A polymer according to claim 1 consisting essentially of recurring units of the formula

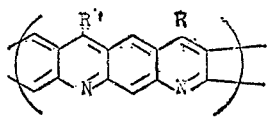

wherein R is as defined above and R′ is hydrogen or an alkyl radical of 1 to 5 carbon atoms.

5. A polymer according to claim 1 consisting essentially of recurring units of the formula

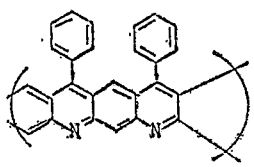

6. A polymer according to claim 1 consisting essentially of recurring units of the formula

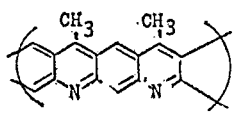

7. A polymer according to claim 1 consisting essentially of recurring units of the formula

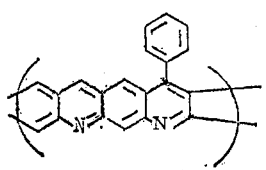

8. A polymer according to claim 1 consisting essentially of recurring units of the formula

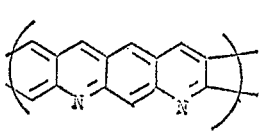

9. A condensed thermally stable polymer prepared by heating a mixture containing polymers consisting essentially of recurring units of the formula

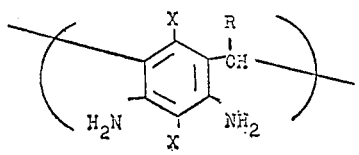

and

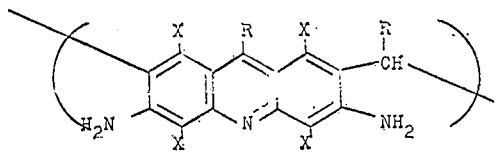

wherein X is hydrogen or an alkyl radical of 1 to 5 carbon atoms and R is a hydrocarbon radical of 1 to 17 carbon atoms selected from the group consisting of alkyl, aryl, alkaryl and aralkyl, in polyphosphoric acid at temperatures of from about 250° C. up to about 450° C. until at least about 25% of the total theoretical condensation has occurred.

10. A condensed thermally stable polymer prepared by heating a polymer consisting essentially of recurring units of the formula

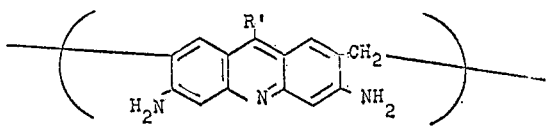

wherein R is hydrogen or an alkyl radical of 1 to 5 carbon atoms, in polyphosphoric acid at temperatures of from about 250° C. up to about 450° C. until at least about 25% of the total theoretical condensation has occurred.

11. A condensed thermally stable polymer prepared by heating a mixture containing polymers consisting essentially of recurring units of the formula

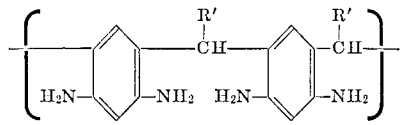

and

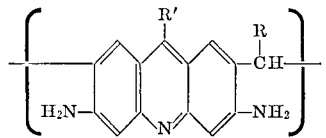

wherein R is a hydrocarbon radical of 1 to 17 carbon atoms selected from the group consisting of alkyl, aryl, alkaryl and aralkyl, and R' is hydrogen or an alkyl radical of 1 to 5 carbon atoms, in polyphosphoric acid at temperatures of from about 250° C. up to about 450° C. until at least about 25% of the total theoretical condensation has occurred.

12. A process for preparing condensed heterocyclic polymers which comprises condensing the reaction products selected from the group consisting of reaction products of a 1,3-benzenediamine or an acid salt thereof with an aldehyde having the formula

wherein R is a hydrocarbon radical of 1 to 17 carbon atoms selected from the group consisting of alkyl, aryl, alkaryl and aralkyl and acetals thereof, in acidic medium having a pH up to about 5, and reaction products of a 1,1-bis(2,4-diaminophenyl)alkane with a member selected from the group consisting of aldehydes having the formula

wherein R has the meaning given above, acetals thereof, N-formylated amines, formic acid and esters of formic acid, in acidic medium having a pH up to about 5, by heating said reaction product in polyphosphoric acid at a temperature of from about 250° C. up to about 450° C. until at least 25% of the total theoretical condensation has occurred.

13. A process according to claim 12 wherein the condensation temperature is from about 290° C. up to about 350° C.

14. A process according to claim 12 wherein said reaction product is obtained by reacting a 1,3-benzenediamine having the formula

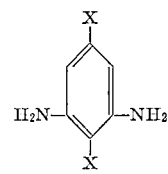

or an acid salt thereof with said aldehyde at a temperature from about —25° C. to 200° C.

15. A process according to claim 12 wherein said reaction product is obtained by reacting a 1,1-bis(2,4-diaminophenyl) alkane having the formula

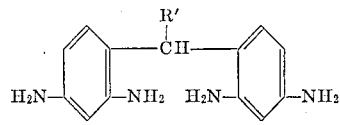

wherein R' is hydrogen or an alkyl radcal of 1 to 5 carbon atoms or an acid salt thereof with a coreactant selected from the group consisting of formic acid, esters of formic acid and N-formylated amines at a temperature from about 25° C. to 250° C.

16. A process according to claim 12 wherein said reaction product is obtained by reacting a 1,1-bis(2,4-diaminophenyl)alkane having the formula

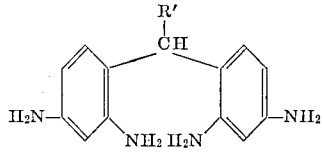

wherein R' is hydrogen or an alkyl radical of 1 to 5 carbon atoms or an acid salt thereof with said aldehyde at a temperature from about —25° C. to 200° C.

References Cited

UNITED STATES PATENTS

| | | | |
|---|---|---|---|
| 2,892,811 | 6/1959 | Irany | 260—72.5 |
| 2,429,554 | 10/1947 | Kistler | 260—72.5 |
| 2,495,890 | 1/1950 | Danforth | 260—72.5 |
| 3,244,517 | 4/1966 | Lind | 260—72.5 |
| 3,418,261 | 12/1968 | Idelson et al. | 260—2 |

HAROLD D. ANDERSON, Primary Examiner

E. M. WOODBERRY, Assistant Examiner

U.S. Cl. X.R.

260—30.6, 32.6, 279